Patented Mar. 25, 1924.

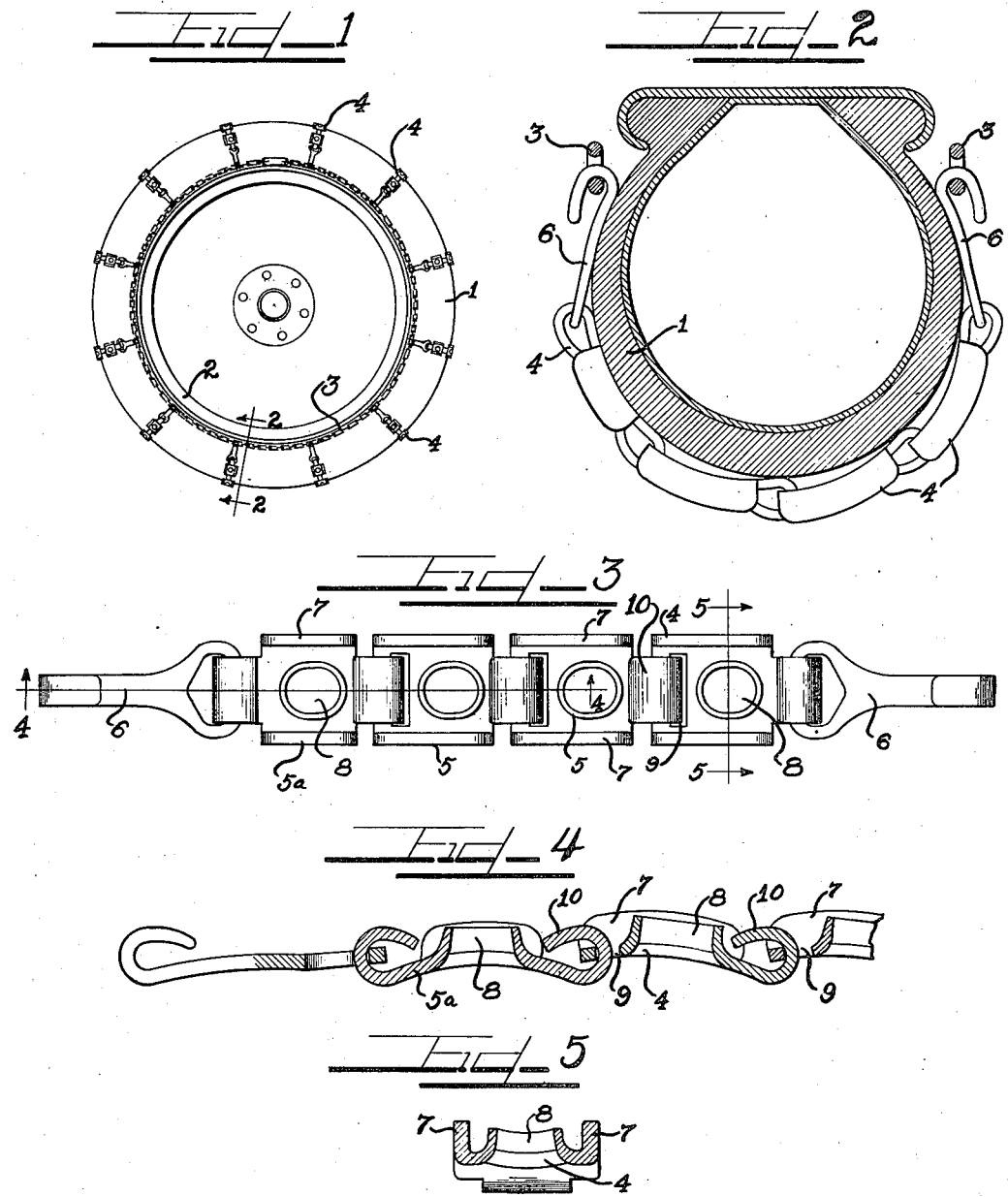

1,488,269

UNITED STATES PATENT OFFICE.

ALEXANDER R. MIERZEJEWSKI, OF CHICAGO, ILLINOIS.

ANTISKID DEVICE.

Application filed November 13, 1922. Serial No. 600,536.

*To all whom it may concern:*

Be it known that I, ALEXANDER R. MIERZEJEWSKI, a citizen of the United States, and a resident of the city of Chicago, in the county of Cook and State of Illinois, have invented certain new and useful Improvements in an Antiskid Device; and I do hereby declare that the following is a full, clear, and exact description of the same, reference being had to the accompanying drawings, and to the numerals of reference marked thereon, which form a part of this specification.

This invention relates to anti-skid devices for tire treads of that type which may be attached to or removed from tires as occasion requires, and comprises a flexible member formed from metal stamping and provided with grippers and lateral thrust absorbers for positively retaining the tire treads from slipping in any direction.

The invention comprises the novel mechanism hereinafter described and more particularly pointed out and defined in the appended claim.

In the accompanying drawings, which illustrate a preferred embodiment of this invention, and in which similar reference numerals refer to similar features in the different views:

Figure 1 is an elevational view of a vehicle wheel with my invention applied thereto.

Figure 2 is an enlarged section substantially upon the line 2—2 of Figure 1.

Figure 3 is an enlarged plan view of one of the flexible anti-skid members.

Figure 4 is a section on the line 4—4 of Figure 3.

Figure 5 is a section on the line 5—5 of Figure 3.

As shown on the drawings:

In the illustrated form of this invention, there is shown an anti-skid device applied to the tire 1 of a wheel 2. The anti-skid device as a whole comprises the anchor chains 3, which may be of any well-known form, and my novel flexible transverse element or members 4 removably attached thereto, one of which is shown in detail in Figures 3, 4 and 5, and which forms the subject matter of this invention.

The flexible element or member 4 is in the form of a chain and comprises a series of connected links 5, the end links having the hook members 6 attached thereto. Each link is preferably stamped from a suitable metal blank so as to form the depending side flanges 7 and the central crown or downwardly flanged aperture 8, the flanges 7 serving as grippers in the forward or rearward travel of the wheel and the crowns or flanges of the apertures serving as lateral thrust absorbers to prevent the wheels from skidding in a lateral direction. Each link has a slot 9 at one end and a returned bent end 10 at the other end whereby the same may be connected together as shown in Figures 3 and 4. In the present instance, one end link as 5ª has both ends bent into hook-like formation in order that the attaching hook member 6 may be fastened thereto. These returned bent ends of the links are curved or of arcuate form and come in contact with the road and form pivotal supports upon which the links rock in passing over the ground or pavement.

It will of course be understood that the ground or pavement is usually wet or covered with ice or snow when such anti-skid devices are desirable, and that the flanges 7 will serve as grippers to produce the desired traction and that the crowns 8 will bite sufficiently into the supporting surface to prevent lateral skidding of the wheels.

It will be appreciated that the device involving this invention can be rapidly and cheaply manufactured and readily assembled, and that when in use it produces a good traction and also provides against lateral skidding.

I am aware that numerous details of construction may be varied through a wide range without departing from the principles of this invention, and I therefore do not purpose limiting the patent granted otherwise than necessitated by the prior art.

I claim as my invention:

An anti-skid device comprising a series of pivotally conected links. Each link having lateral flanges and an intermediate aperture surrounded by an enclosing grand gripping wall, the ends of adjacent links being connected by a returned bent end of arcuate form on one engaging a slot in the other for the purpose set forth.

In testimony whereof I have hereunto subscribed my name in the presence of two subscribing witnesses.

ALEXANDER R. MIERZEJEWSKI.

Witnesses:
WILLARD FOX CLARK,
CHARLES W. HILLS, Jr.